March 11, 1930. F. A. DAECHSEL 1,749,754
DIRECTION INDICATOR
Filed June 2, 1925 2 Sheets-Sheet 1
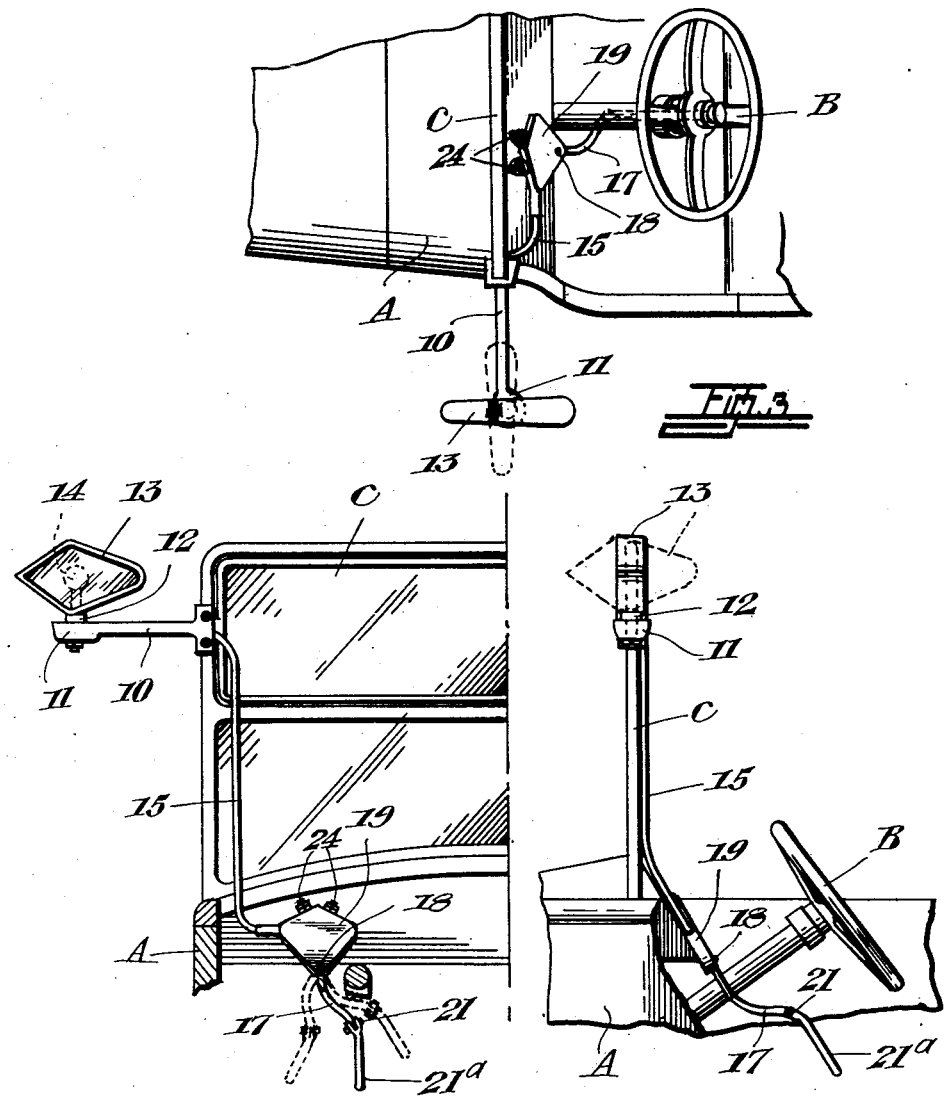
INVENTOR
FREDERICK A. DAECHSEL.
BY Featherstonhaugh & Co.
ATTYS.

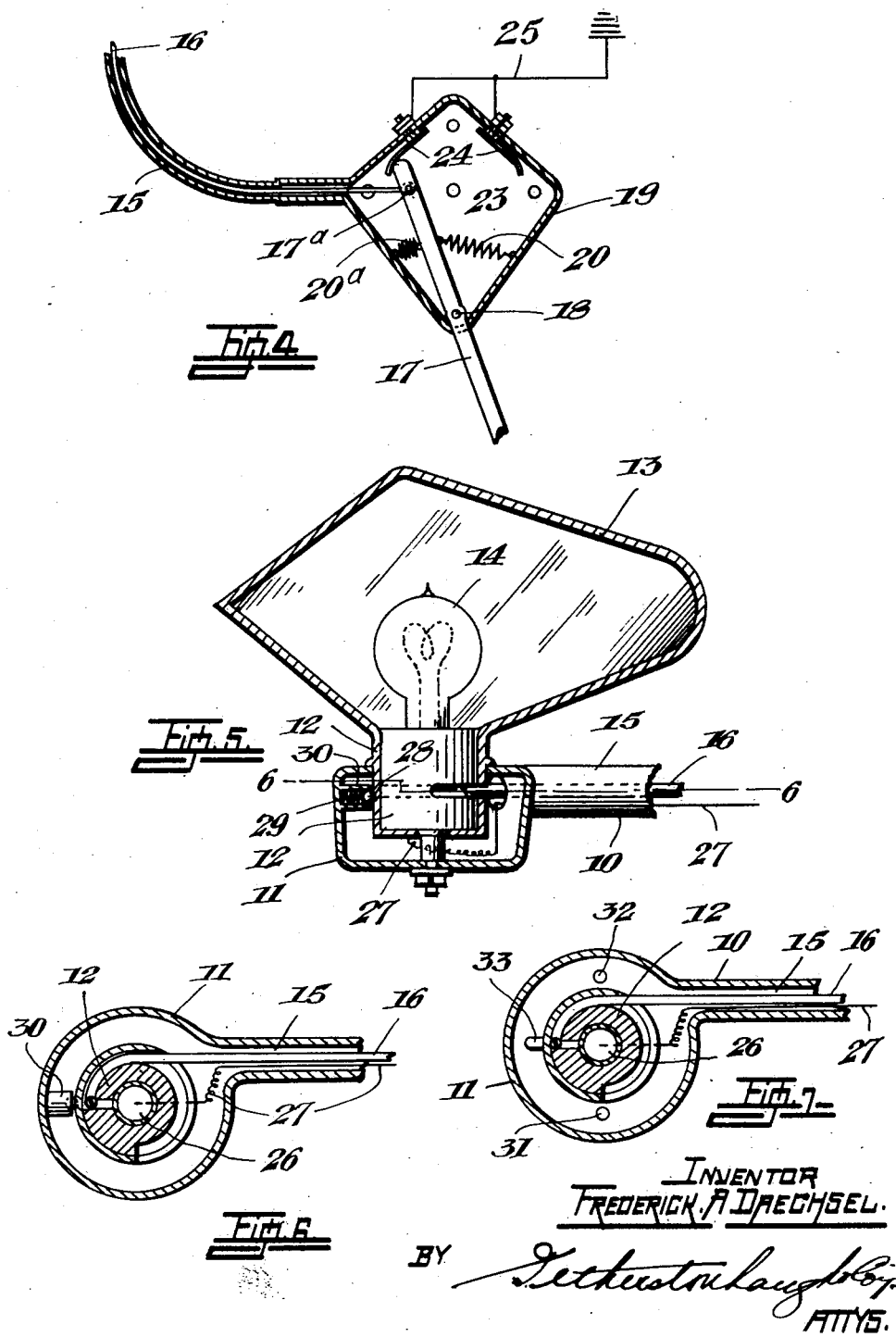

Patented Mar. 11, 1930

1,749,754

UNITED STATES PATENT OFFICE

FREDERICK AUGUST DAECHSEL, OF OTTAWA, ONTARIO, CANADA

DIRECTION INDICATOR

Application filed June 2, 1925. Serial No. 34,386.

This invention relates to improvements in direction indicators and the objects of the invention are to provide a direction indicator for vehicles adapted to be operated otherwise than by the hand or foot whereby the driver's hands and feet are left free to operate the steering and brake mechanisms and at the same time it enables him to successfully operate the direction indicator.

A further object is to provide a direction indicator for automobiles and the like to be operated from the driver's seat by the driver's knees.

Still further objects are to so improve and modify the construction of a direction indicator for vehicles operable otherwise than by hand that the several parts will more satisfactorily perform the various functions required of them.

With the foregoing and other objects in view the invention consists in the novel construction, combination and arrangement of parts as described and illustrated in the present specification and accompanying drawings in which an example of my invention is disclosed.

Referring now to the drawings in which like characters of reference indicate corresponding parts in each figure, Figure 1 is an elevation of part of a windshield of an automobile fitted with my improved indicator, Figure 2 is a side view of Figure 1, part of the car being broken away to more clearly indicate the operating mechanism, Figure 3 is a fragmentary plan of a car with my improved indicator attached, Figure 4 indicates the means for simultaneously illuminating and operating the direction indicator, Figure 5 is a vertical section through the indicator, Figure 6 is a section on line 6—6 of Figure 5, Figure 7 shows a modified form for illuminating the indicator, and Figure 8 illustrates a diagrammatic view of the wiring.

Referring now more particularly to the drawings, A designates an automobile, B the steering wheel and C the windshield, all of well known construction.

Rigidly mounted on the windshield C is a bracket member 10 the other end of which is formed of a socket 11 in which is rotatably mounted, through the stem and bulb socket 12, a casing 13 of any suitable formation comprising the indicator having therein a lamp 14. This indicator may be of any well known construction and is adapted, as illustrated in Figure 3, to point in the direction in which the car is travelling when not in use. On the driver wishing to indicate his intention to turn to the left the indicator mechanism is operated to cause the member 13 to be illuminated and to simultaneously rotate one quarter turn to the left.

Connected to the socket member 11 is a Bowden control 15, one end of the wire 16 passing therethrough being connected to the stem and bulb socket 12, while the other end is connected to the lever 17 at 17ª. The lever 17 is pivotally mounted substantially midway of its length at 18 in a suitable casing 19 which may be attached to the instrument board adjacent the steering column. This lever is adapted to extend downwardly in S-formation so as to fit between the knees of the driver and to be preferably operable by his knees and whereby, as indicated in Figure 1, the driver on desiring to turn to the left will press the S-shaped lever 17 with his right knee to the position indicated by the dotted lines in Figure 1, causing the indicator to point in the same direction. Upon releasing the lever 17 it will automatically return to its normal position through the operation of a spring 20 connecting the lever and the casing 19, the joint 21 permitting the adjustment of the extension 21ª to suit conditions, namely the type of motor car or the person driving as the case may be.

When the lever 17 is pressed with the left knee it will move to the position indicated by the dotted lines in Figure 1 operating the direction indicator accordingly and automatically assuming, when the knee pressure is released, its normal position to the action of the spring 20ª connecting the lever with the side of the casing 19.

Simultaneously with the operation as described of moving the indicator, the bulb or lamp 14 in the indicator, the case of which may be provided with glass or transparent material having indicating letters thereon, is illuminated, this being accomplished through an extension 23 of the lever 17 which is designed to contact with the terminals 24 of the ground wire 25, the Bowden wire 16 being connected at one end to the lever extension 23 and at the other end to the socket 26 so that when the lever 17 is moved to the left the extension 23 will contact with the point 24 grounding the current from the wire 27, thus lighting the bulb 14.

The circuit as particularly illustrated in Figure 8 consists of a single wire circuit and includes the battery 35, ignition switch 36, main lead 37, lead 38, bulb 14 and lead 27 which is grounded through the operation of the lever 17, previously described.

It should be noted that the lead 27 is connected in any well known manner to the lever 17, adjacent its pivotal point and with the current is conducted to the terminals 24 by the arm 23 and thus grounded in the regular way.

To insure that the indicator when not operated is held in normal position I provide a spring lock comprising a ball 28 and spring 29 mounted in the socket 30.

In the modified form illustrated in Figure 7 the grounding of the current is through the contacts 31 and 32. As the indicator is moved either to the right or left the point 33 engages the contacts 31 or 32 as the case may be.

From the foregoing it will be seen that while the mechanism for simultaneously illuminating and operating my direction indicator is efficient and very simple, the essential feature of my invention is the fact that this mechanism is operable, through a lever 17, otherwise than by the hands or feet of the driver of the vehicle and constitutes, it is submitted, a new departure and a material improvement over anything in the nature of direction indicator mechanisms heretofore in use.

As many changes could be made in the above construction and many apparently widely different embodiments of my invention, within the scope of the claim, constructed without departing from the spirit or scope thereof, it is intended that all matter contained in the accompanying specification and drawings shall be interpreted in an illustrative and not in a limiting sense.

What I claim as my invention is:

A direction signal for automobiles comprising a turnably mounted casing adapted to be turned through 180 degrees, positioning means comprising a ball and spring mounted in a socket for releasably holding said casing in mid position, a Bowden wire having one end operatively connected with the casing, a substantially S-shaped lever pivoted intermediate of its length, the other end of the Bowden wire being connected to one end of said lever, and equalizing springs operatively connected with opposite sides of the lever whereby it is normally maintained in mid position.

In witness whereof I have hereunto set my hand.

FREDERICK AUGUST DAECHSEL.